United States Patent
Nakamura et al.

(12) 
(10) Patent No.: US 6,617,416 B2
(45) Date of Patent: Sep. 9, 2003

(54) POLYOXYMETHYLENE COPOLYMER AND MOLDED ARTICLE THEREOF

(75) Inventors: Takahiro Nakamura, Yokkaichi (JP); Masanori Furukawa, Yokkaichi (JP); Akira Okamura, Yokkaichi (JP); Daigo Nakaya, Yokkaichi (JP); Isamu Masumoto, Yokkaichi (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 10/257,476

(22) PCT Filed: Mar. 26, 2002

(86) PCT No.: PCT/JP02/02920

§ 371 (c)(1),
(2), (4) Date: Oct. 15, 2002

(87) PCT Pub. No.: WO02/077049

PCT Pub. Date: Oct. 3, 2002

(65) Prior Publication Data

US 2003/0125512 A1 Jul. 3, 2003

(30) Foreign Application Priority Data

Mar. 27, 2001 (JP) ........................................ 2001-090106
Mar. 27, 2001 (JP) ........................................ 2001-090107

(51) Int. Cl.[7] ................................................ C08G 2/22
(52) U.S. Cl. ...................... 528/250; 528/233; 528/250; 528/425
(58) Field of Search ................................. 528/233, 250, 528/425

(56) References Cited

U.S. PATENT DOCUMENTS

| 4,681,927 A | | 7/1987 | Umemura et al. |
| 4,751,272 A | | 6/1988 | Okita et al. |
| 4,814,424 A | | 3/1989 | Suzumori et al. |
| 5,079,330 A | * | 1/1992 | Makabe et al. ............... 528/87 |
| 5,288,840 A | * | 2/1994 | Morishita et al. ........... 528/238 |
| 5,688,897 A | | 11/1997 | Tanimura et al. |
| 5,962,623 A | * | 10/1999 | Eckardt et al. .............. 528/232 |

FOREIGN PATENT DOCUMENTS

| EP | 1 275 671 | * | 1/2003 |
| JP | 40-21148 | | 9/1940 |
| JP | 08-059767 | | 3/1996 |

* cited by examiner

*Primary Examiner*—Samuel A. Acquah
(74) *Attorney, Agent, or Firm*—Sherwin & Shalloway

(57) ABSTRACT

A polyoxymethylene copolymer which is a polyoxymethylene copolymer obtained by copolymerizing trioxane and 8 to 20 mol, per 100 mol of the trioxane, of 1,3-dioxolane and which (i) has a crystallization time period of 10 to 2,000 seconds at 143° C., (ii) withstands 30 to 1,000 cycles of a bending durability test and (iii) has residence heat stability for 40 minutes or more, and a molded article formed of the copolymer.

According to the present invention, there can be provided a polyoxymethylene copolymer excellent in bending durability and heat stability and excellent in moldability, and a molded article formed thereof.

11 Claims, No Drawings

POLYOXYMETHYLENE COPOLYMER AND MOLDED ARTICLE THEREOF

DETAILED DESCRIPTION OF THE INVENTION

1. Field of the Invention

The present invention relates to a polyoxymethylene copolymer that is excellent in heat stability, excellent in bending fatigue resistance and remarkably free of deposition on a mold during molding thereof, and a molded article thereof.

2. Prior Art

A polyoxymethylene copolymer is excellent in mechanical and thermal performances and is widely used as a typical engineering plastic in the fields of machinery, electric/electronic appliances and automobiles.

Generally, a polyoxymethylene copolymer is obtained by copolymerizing formaldehyde or its cyclic oligomer such as trioxane or tetraoxane with a comonomer copolymerizable therewith. However, it is known that the polymer easily undergoes decomposition at its terminal.

For example, it is described in U.S. Pat. Nos. 25 4,681,927, 4,814,424, 5,688,897 and 4,751,272 that trioxane and 1 to 5 mol %, based on the trioxane, of a comonomer such as 1,3-dioxolane are copolymerized to obtain a polyoxymethylene copolymer.

For obtaining a stabilized polyoxymethylene copolymer, therefore, it is conventional practice to treat terminal molecules of the polyoxymethylene copolymer in various ways and add thereto additives such as an antioxidant, a heat stabilizer, and the like.

For example, for improving a polyoxymethylene copolymer in heat stability, it is disclosed, for example, in Japanese Patent Publication No. 40-21148 that a triazine derivative typified by melamine, a so-called formaldehyde capturer, is added.

However, the triazine derivative is an additive effective for improving a polyoxymethylene copolymer in heat stability on one hand, but is poor in compatibility with a polyoxymethylene copolymer on the other hand. When an oxymethylene copolymer containing a large amount of the triazine derivative is continuously molded, therefore, there is caused a problem that the triazine derivative adheres to a mold (degradation in mold deposit resistance).

Further, JP-A-8-59767 discloses that an oxymethylene copolymer produced from trioxane and 3 to 7 mol %, based on the trioxane, of 1,3-dioxolane by a conventional method has fewer portions that cause heat unstability than a copolymer obtained using ethylene oxide as a comonomer. However, the amount of 1,3-dioxolane in the above production method is insufficient for producing an effect on improvement of heat stability.

Meanwhile, the polymerization yield in prior art is improved by a method in which the amount of a catalyst is increased. However, it is known that the mere increase in the catalyst amount undesirably promotes the formation of unstable portions.

PROBLEMS TO BE SOLVED BY THE INVENTION

It is a first object of the present invention to provide a polyoxymethylene copolymer having excellent heat stability and excellent properties against bending fatigue (to be referred to as "bending durability" hereinafter).

It is a second object of the present invention to provide a polyoxymethylene copolymer which forms remarkably few deposits adhering to a mold during molding, that is, which is excellent in moldability.

It is a third object of the present invention to provide a polyoxymethylene copolymer which accomplishes a high polymerization yield and attains a low weight loss under heat.

It is another object of the present invention to provide a polyoxymethylene copolymer molded article having excellent properties against bending fatigue.

It is still another object of the present invention to provide a method for producing a polyoxymethylene copolymer having the above-described excellent properties.

MEANS TO SOLVE THE PROBLEMS

According to studies made by the present inventors, it has been found that the above objects of the present invention are achieved by providing a polyoxymethylene copolymer which is a polyoxymethylene copolymer obtained by copolymerizing trioxane and 8 to 20 mol, per 100 mol of the trioxane, of 1,3-dioxolane and which (i) has a crystallization time period of 10 to 2,000 seconds at 143° C., (ii) withstands 30 to 1,000 cycles of a bending durability test and (iii) has residence heat stability lasting for 40 minutes or more.

According to the present invention, there can be obtained a polyoxymethylene copolymer excellent in bending durability and also excellent in heat stability. According to the present invention, further, there can be obtained a polyoxymethylene copolymer which remarkably causes few deposits adhering to a mold during molding and is therefore excellent in molding productivity.

The polyoxymethylene copolymer of the present invention will be explained further in detail hereinafter.

The polyoxymethylene copolymer of the present invention is obtained from trioxane as a main monomer and 8 to 20 mol, per 100 mol of the trioxane, of 1,3-dioxolane as a comonomer. In this case, a cation-active catalyst is used as a catalyst.

The polymerization method of the polyoxymethylene copolymer includes a bulk polymerization method and a melt polymerization method. As a polymerization method, for example, preferred is a bulk polymerization method using substantially no solvent or a quasi-bulk polymerization method using 20% by weight or less, based on the monomers, of a solvent. These bulk polymerization method is a method in which monomers in a molten state are polymerized and a solid polymer in a bulk or powdered state is obtained as the polymerization proceeds.

The monomer as a raw material is trioxane that is a cyclic trimer of formaldehyde, and as a comonomer, 1,3-dioxolane is used. The amount of 1,3-dioxolane per 100 mol of trioxane is in the range of from 8 to 20 mol, preferably in the range of from 8.5 to 18 mol, particularly preferably in the range of from 9 to 15 mol. When the amount of 1,3-dioxolane is greater than the above upper limit, the polymerization yield is low. When it is smaller than the above lower limit, the heat stability is low.

The polymerization catalyst is selected from cation-active catalysts. These cation-active catalysts include Lewis acids typified by halides of boron, tin, titanium, phosphorus, arsenic and antimony, specifically, compounds such as boron trifluoride, tin tetrachloride, titanium tetrachloride, phosphorus pentachloride, phosphorus pentafluoride, arsenic pentafluoride, antimony pentafluoride and complexes or salts of these; protonic acids such as trifluoromethanesulfonic acid, perchloric acid, esters of protonic acids typified by an ester of perchloric acid and a lower aliphatic alcohol and anhydrides of protonic acids typified by mixed anhydrides of perchloric acid and a lower aliphatic carboxylic acid; triethyloxonium hexafluorophosphate, triphenylmethylhexafluoroarsenate, acetylhexafluoroborate, heteropolyacid or acidic salt thereof, and isopolyacid or acidic salt thereof. Of these, a compound containing boron trifluoride, a hydrate of boron trifluoride or a coordination complex compound thereof is particularly suitable, and boron trifluoride diethyl etherate and boron trifluoride dibutyl etherate that are coordination complexes with ethers are particularly preferred.

The amount of the above catalyst per mole of trioxane is generally $1\times10^{-7}$ to $1\times10^{-3}$ mol, preferably $1\times10^{-7}$ to $1\times10^{-4}$ mol. When the amount of the catalyst is greater than the above upper limit, the heat stability is low, and when it is smaller than the above lower limit, the polymerization yield is low.

For adjusting the molecular weight of the polyoxymethylene copolymer, the above polymerization method may use a proper molecular weight adjusting agent as required. The molecular weight adjusting agent includes a carboxylic acid, a carboxylic acid anhydride, an ester, an amide, an imide, phenols and an acetal compound. Phenol, 2,6-dimethylphenol, methylal and polyoxymethylene dimethoxide are particularly preferred, and methylal is the most preferred. The molecular weight adjusting agent is used alone or in the form of a solution. When it is used in the form of a solution, the solvent therefor includes aliphatic hydrocarbons such as hexane, heptane and cyclohexane; aromatic hydrocarbons such as benzene, toluene and xylene; and hydrocarbon halides such as methylene dichloride and ethylene dichloride.

The polymerization apparatus for obtaining the polyoxymethylene copolymer of the present invention can be any one of batch method and continuous method apparatuses. As a batch method polymerization apparatus, there can be used a general reactor with a stirrer. The continuous method polymerization apparatus can be selected from a kneader having stirring capability and accurate temperature control capability for coping with sharp solidification and heat generation during polymerization and further having a self-cleaning function for preventing adherence of scales, a twin-screw continuous extruder, a twin-screw paddle type continuous mixer or other continuous trioxane polymerization apparatus that has been so far proposed.

Polymerization apparatuses of two or more types may be used in combination.

In practicing the present invention, it is important to control the polymerization temperature before and after a polymerization yield of 60 to 90% (to be defined as "boundary yield") is reached. The above "polymerization yield" refers to a data obtained by measurement made according to a method to be described later. The boundary yield is preferably 65 to 90%, more preferably 70 to 90%, most preferably 80 to 90%. The polymerization temperature that should be maintained until the polymerization yield reaches the boundary yield is in the range of from 60 to 115° C., preferably 60 to 110° C., more preferably 60 to 100° C., most preferably 60 to 90° C. The polymerization temperature that should be maintained after the polymerization yield reaches the boundary yield is in the range of from 0 to 100° C., preferably 0 to 80° C., more preferably 0 to 70° C., most preferably 0 to 60° C. When the polymerization temperature is higher than the above upper limit before the polymerization yield reaches the boundary yield, the heat stability is low, and the polymerization yield is low. Further, when the polymerization temperature is lower, the heat stability is maintained, but the polymerization yield is low as well. When the polymerization temperature after the polymerization yield reaches the boundary yield is higher than the above upper limit, the heat stability is low, and when it is lower than the above lower limit, disadvantageously, the torque of stirring power of a polymerization apparatus is caused to increase. Further, the polymerization temperature after the boundary yield is reached is required not to be higher than the temperature before the boundary yield is reached. When this relationship is reversed, the heat stability is low.

The polymerization time period is determined to be in the range of from 3 to 120 minutes, and it is preferably in the range of from 5 to 60 minutes, particularly preferably in the range of from 10 to 60 minutes. When the polymerization time period is smaller, the heat stability and yield of the resin are caused to be poor. When the polymerization time period is longer, the productivity is caused to be poor. The polymerization time period has its preferable lower limit depending upon the amount ratio of 1,3-dioxolane to be copolymerized. For example, when the amount of 1,3-dioxolane per 100 mol of trioxane is 8 to 11 mol, the polymerization time period is at least 3 minutes, preferably at least 4 minutes. When the amount of 1,3-dioxolane per 100 mol of trioxane is in the range of from 11 to 20 mol, the polymerization time period is at least 5 minutes, preferably, at least 6 minutes.

After completion of the polymerization, a crude copolymer is discharged from the polymerization apparatus. It is required to terminate the polymerization reaction by immediately mixing the crude copolymer with a deactivator to bring the crude copolymer into contact with the deactivator, thereby deactivating the polymerization catalyst. Generally, in the present invention, desirably, the polymerization is terminated by deactivating the catalyst at a point of time when the polymerization yield reaches at least 90%, preferably at least 95%, more preferably at least 97%.

The deactivator for use can be selected from a trivalent organic phosphorus compound, an amine compound or a hydroxide of an alkali metal or alkaline earth metal. The amine compound includes primary, secondary and tertiary aliphatic amines and aromatic amines, heterocyclic amines, hindered amines and other catalyst deactivators that are known per se. Specific examples of the amine compound include ethylamine, diethylamine, triethylamine, mono-n-butylamine, di-n-butylamine, tri-n-butylamine, aniline, diphenylamine, pyridine, piperidine and morpholine. Of these, trivalent organic phosphorus compounds and tertiary amines are preferred, and triphenyl phosphine is the most preferred.

The amount of the deactivator is not restrictive so long as the reaction is terminated by deactivation of the catalyst. However, the amount of the deactivator per mole of the polymerization catalyst is generally 0.5 to 30 mol, preferably, 1 to 20 mol.

When the deactivator is used in the form of a solution or a suspension, the solvent therefor is not critical. The solvent can be selected from water, alcohols or other various aliphatic or aromatic organic solvents such as acetone, methyl ethyl ketone, hexane, cyclohexane, heptane, benzene, toluene, xylene, methylene dichloride or ethylene dichloride.

In the deactivation treatment in any case, the crude copolymer is preferably a fine powder. For this purpose, preferably, the polymerization apparatus has the function of fully pulverizing a bulk polymerization product. Further, there may be employed a constitution in which a reaction product after the polymerization is pulverized with a pulverizer in a separate step and then the deactivator is added, or the reaction product may be pulverized and stirred at the same time in the presence of the deactivator.

Concerning the degree of the pulverization, preferably, the pulverization is carried out such that the powder has the following particle sizes; When the powder is classified with a Ro-Tap shaker using standard sieves, 100% by weight of the powder passes through a 10-mesh sieve, that at least 90% by weight thereof passes through a 20-mesh sieve and that at least 60% by weight thereof passes through a 60-mesh sieve. When the pulverization is not so carried out as to attain the above particle sizes, the reaction between the deactivator and the catalyst is not completed, and a remaining catalyst therefore gradually proceeds with depolymerization to decrease the molecular weight.

The copolymer in which the polymerization catalyst is deactivated is obtained at high yields, so that it can be directly transferred to a stabilization step to follow. If it is required to further purify the polymer, the polymer may be subjected to washing, separation and recovery of unreacted monomer, and drying.

In the stabilization step, stabilization methods in the following (1) and (2) can be employed.
(1) A method in which the above-obtained polyoxymethylene copolymer is melted under heat to remove an unstable portion.
(2) A method in which an unstable portion of the above-obtained polyoxymethylene copolymer is hydrolyzed in an aqueous medium to remove the unstable portion.

The copolymer is stabilized by such a method and then pelletized, whereby a stabilized moldable polyoxymethylene copolymer can be obtained.

Of the above methods, the method in the above (1) is preferred as an industrial method since it has a simpler step than the method in the above (2). That is, when the method in the above (1) is employed, preferably, the polyoxymethylene copolymer is melted and kneaded in a temperature range of from its melting temperature (mp) to a temperature higher than the melting temperature by 100° C. under a pressure of 760 to 0.1 Torr. When the treatment temperature is lower than the melting temperature of the polyoxymethylene copolymer, the decomposition of an unstable portion is insufficient, and no stabilization effect can be obtained. When the treatment temperature exceeds the temperature higher than the melting temperature (mp) by 100° C., undesirably, yellowing is caused, the polymer is decomposed in main chain due to heat, and at the same time, an unstable portion is formed, which results in impairment of heat stability. When the pressure during the treatment is higher than 760 Torr, there is no effect on removing a gas formed by decomposition of an unstable portion out of the system, and no sufficient stabilization effect can be obtained. When it is lower than 0.1 Torr, an apparatus for accomplishing such a high pressure-reduction degree is expensive, which is industrially disadvantageous. Further, undesirably, a molten resin is liable to flow out of a suction vent port, which is liable to cause a trouble in operation.

As an apparatus for the above stabilization treatment, a single-screw or twin or more-screw vent-type extruder can be used. For retaining a necessary residence time period, it is advantageous to employ a method in which two or more extruders are arranged in series. In the above stabilization treatment, stabilizers such as an antioxidant, a heat stabilizer, etc., may be added during melt-kneading the polyoxymethylene copolymer.

The antioxidant that is usable includes sterically hindered phenols such as triethylene glycol-bis-3-(3-tert-butyl-4-hydroxy-5-methylphenyl)propionate, pentaerythrityl-tetrakis-3-(3,5-di-tert-butyl-4-hydroxyphenyl)propionate, and the like. The heat stabilizer includes amine-substituted triazines such as melamine, methylolmelamine, benzoguanamine, cyanoguanidine, N,N-diarylmelamine, polyamides, urea derivatives, urethanes, and inorganic acid salts, hydroxides and organic acid salts of sodium, potassium, calcium, magnesium and barium.

As the above heat stabilizer, amine-substituted triazine compounds are preferred, and melamine is particularly preferred. The amount thereof is 0.001 to 1% by weight based on the polyoxymethylene copolymer. Further, in a preferred embodiment, magnesium hydroxide particles are used as a heat stabilizer. The amount of magnesium hydroxide particles are 0.001 to 1% by weight based on the polyoxymethylene copolymer. Above all, a particularly excellent effect is achieved when an amine-substituted triazine compound and magnesium hydroxide particles are used in combination as a heat stabilizer.

Further, additives may be added to the polyoxymethylene copolymer of the present invention as required, and the additives include a colorant, a nucleating agent, a plasticizer, a mold release agent, an antistatic agent such as polyethylene or glycerin, an ultraviolet absorbent such as a benzotriazole-based or benzophenone-based compound and a photo-stabilizer such as a hindered amine.

The polyoxymethylene copolymer according to the present invention can give valuable molded articles since it has properties to be described below.
(a) The polyoxymethylene copolymer is excellent in bending fatigue resistance (bending durability) of a molded article. The polyoxymethylene copolymer can give a molded article having bending durability of a value of 30 to 1,000 cycles, preferably, 50 to 500 cycles in a bending durability test to be described later. While a molded article from a conventionally known polyoxymethylene copolymer obtained by copolymerizing approximately 5 to 6.5% of 1,3-dioxolane has bending durability of a value approximately 5 to approximately 20 cycles of the bending durability test, a molded article from the copolymer of the present invention is remarkably improved in bending durability.

Since the copolymer of the present invention therefore gives molded articles remarkably improved in bending fatigue resistance, it has a remarkably excellent value as a material for molded articles that are required to have high bending durability.
(b) The polyoxymethylene copolymer has a crystallization time period of 10 to 2,000 seconds, or 30 to 1,500 seconds under optimum conditions. When the crystallization time period is less than 10 seconds, a molded article is liable to be distorted. When it exceeds 2,000 seconds, undesirably, a molding cycle comes to take a longer period of time.
(c) The polyoxymethylene copolymer is excellent in heat stability. According to a residence heat stability test to be described later, it has a value of at least 40 minutes, preferably at least 60 minutes, particularly preferably at least 70 minutes. According to a heat weight loss ratio test to be described later, it has a value, as a loss ratio, of 2.5% by weight or less, preferably 2% by weight or less, most preferably 1.5% by weight or less.

(d) The polyoxymethylene copolymer causes few deposits adhering to a mold during molding thereof and is excellent in molding productivity. According to a mold deposit resistance (MD resistance) test to be described later, it has a value of at least 4,000 shots, preferably at least 5,000 shots in the number of times of shots.

The polyoxymethylene copolymer of the present invention is excellent in bending fatigue resistance, so that it can be suitably used for a hinge part. The above "hinge part" refers to a molded article having a certain portion that is a small-thickness portion (hinge portion) to which a bending or folding load is applied at least once. The hinge portion is not specially limited in form, and it may have the form of a sheet, a band, a stripe or the like. The thickness and the length of the hinge portion are not limited, either. Those parts having any portion that substantially works as a hinge portion are included in the hinge part of the present invention. In the present specification, further, the bending durability is defined as durability against a bending or folding load that is applied to the above hinge portion at least once.

The polyoxymethylene copolymer of the present invention is used for various molded articles by utilizing the properties thereof. Specific uses thereof will be enumerated.

(1) Molded Articles for Automobiles and Vehicles

For example, parts for automobiles such as a pipe holder, an electric wire holder, a connector, an assist clip, a housing material for a bumper, a console box, a door trim and a door checker, parts for vehicles such as a sun visor, and others such as an internal transmission hub for a bicycle.

(2) Molded Parts for Electric and Electronic Use and Molded Parts for Information Recording Machines For example, connectors in electric and electronic fields, a housing case for a connection portion of cores of optical fibers, a disc cartridge, a tape cassette, a tray for a disc-shaped recording medium, a toner case, a film holder and protective covers for electric and electronic parts.

(3) Molded Parts for Medical Applications

For example, an artificial joint, a valve for insertion of a medical treatment tool, and a blood vessel cannula.

(4) Molded Parts for Home Lives

For example, caps and compact containers in the fields of miscellaneous goods, a card case, a tooth brush, tableware, clothing parts, clips, a covered curtain rail, a curtain rail cap, a cover for a liquid container, writing things, a collapsible case frame, and a basket and a handle thereof.

(5) Others

For example, joints for structures, a conveyer chain, a cable chain binder, a roof unit and an anti-vibration clamp.

EXAMPLES

For specifically showing the present invention, Examples and Comparative Examples will be described below, while the present invention shall not be limited thereto. Terms and measurement methods in Examples and Comparative Examples will be described below. Further, as a polymerization apparatus, the following continuous polymerization machines were used.

(1) Continuous Polymerization Machine

A 144 cm long continuous mixing machine having a pair of shafts in a long case having an internal cross section that is formed of two circles partly overlapping each other and has an internal diameter of 20 cm and having a jacket on a circumference thereof, each shaft being provided with a number of pseudo-triangular plates to engage mutually with pseudo-triangular plates of the other, and top ends of the pseudo-triangular plates being capable of cleaning the internal surface of the case and the surfaces of the pseudo-triangular plates of the other.

(2) Bending Durability Test (Bending Fatigue Test)

Measured according to JIS P 8115. The details thereof are as follows.

(i) Preliminary Drying Conditions of Copolymer Pellets

Pellets in an amount of 3 kg were placed in a vat made of stainless steel and preliminarily dried at 90° C. for more than 2 hours. As a dryer, a hot air circulation dryer was used.

(ii) Preparation of Test Piece

The preliminarily dried pellets were charged into a molding machine (supplied by Nissei Jushi Kogyo K. K., Model FS160S, clamping force 160 tf) with a hopper dryer, and test pieces were molded under the following molding conditions. Each test piece had a thickness of 0.8 mm, a width of 12.7 mm and a length of 127 mm.

TABLE 1

| Test piece molding conditions | | |
|---|---|---|
| Cylinder temperature on nozzle side | | |
| Zone 1 | (° C.) | 190 |
| Zone 2 | | 200 |
| Zone 3 | | 200 |
| Zone 4 | | 180 |
| Number of screw revolutions | (rpm) | 60 |
| Injection pressure | (kgf/cm$^2$) | 950 |
| Injection time period | (sec) | 15 |
| Cooling time period | (sec) | 15 |
| Mold temperature | (° C.) | 90 |
| Hopper dryer temperature | (° C.) | 80 |

(iii) Measurement of Bending Durability

1) Conditioning of Test Piece

A test piece molded is condition-adjusted for 48 hours or more in a chamber having a temperature of 23±2° C. at a relative humidity of 50±5%, and then subjected to a bending durability test.

2) Bending Durability Test

A repeated bending fatigue test is carried out under the following conditions and the number of times of bending until breaking is counted.

Testing conditions: Bending angle; ±135 degree, a tension load; 1 kgf,

Testing rate; 220 times/minute, chuck portion R; 0.38 mm

3) Machine Used

MIT method bending fatigue tester (mfd. by Toyo Seiki Seisakusho K K)

(3) Crystallization Time Period

Measured with a polymer crystallization rate measuring apparatus (MK-701, supplied by Hexa Kagaku Ltd.) that optically detected a birefringence change caused by crystallization. An approximately 50 μm thick film sample prepared by hot pressing was melted under heat at 200° C. for 2 minutes, immersed in an oil bath at 143° C. and was allowed to transmit light that had passed through a polarizing plate (polarizer). The transmitted light that had passed through a polarizing plate (analyzer) was detected with a light-receiving element for a light quantity, and a time period until crystallization was measured on the basis of a change in light quantity. In this invention, a total of an induction time period from a start of the measurement at 143° C. to a start of crystallization and a semi-crystallization time period (half of a time period required from a start of crystallization to completion of the crystallization) was measured, and a measurement data was used as a crystallization time period.

(4) Polymerization Yield

20 Grams of a crude copolymer whose polymerization had been terminated was immersed in 20 ml of acetone, then filtered, washed with acetone three times and then vacuum-dried at 60° C. until a constant amount was reached. Then, the polymer was accurately weighted, and a polymer yield was determined on the basis of the following equation.

Polymerization yield=$M_1/M_0 \times 100$ wherein $M_0$; weight before the treatment with acetone, and $M_1$; weight after the treatment with acetone and the drying.

(5) Heat Weight Loss Ratio

A crude copolymer was dried under a reduced pressure of $10^{-2}$ Torr at 60° C. for 24 hours and sieved with a 60 mesh sieve and then obtained 2 g of powder, and a stabilizer (Irganox 245, supplied by Ciba Geigy Ltd., (4.0%)) was added to, and fully mixed with, the thus-prepared crude copolymer. The mixture was placed in a test tube, an atmosphere in the test tube was replaced with nitrogen, and then the mixture was heated under a reduced pressure of 10 Torr at 222° C. for 2 hours. A weight loss ratio in this case is shown.

(6) Intrinsic Viscosity

A crude copolymer in an amount of 0.1% by weight was dissolved in a p-chlorophenol solvent containing 2% of α-pinene, and it was measured at 60° C.

(7) Residence Heat Stability

An injection molding machine having a clamping force of 75 tons was used, a polyoxymethylene copolymer was allowed to reside in a cylinder having a temperature of 240° C. for a predetermined time period, and a residence time period taken until the occurrence of a silver streak was measured. A copolymer having a greater value shows that it is more improved in thermal stability.

(8) Mold Deposit Resistance (MD Resistance)

A polyoxymethylene copolymer was continuously injection-molded with an injection molding machine having a clamping force of 7 tons, at a cylinder temperature of 220° C., at a mold temperature of 70° C. at a molding cycle of approximately 6 seconds, and a number of shots until a mold deposit occurred on a mold was counted.

(9) Melting Temperature

A melting temperature was measured with a differential scanning calorimeter at a temperature elevation rate of 10° C./minutes while the temperature increase was started at room temperature.

Example 1

Two sets of the above-described continuous polymerization machines and a deactivator mixing machine (having a structure in which each of shafts was provided with many screw-like blades in place of the pseudo-triangular plates engaged mutually with the pesudo-triangular plates of the other, and a deactivator solution was injected from a feed port portion to be continuously mixed with a polymer) were connected in series and used as a continuous polymerization apparatus, to produce an oxymethylene copolymer. Trioxane in an amount of 80 kg/hour (889 mol/hour), 1,3-dioxolane in an amount shown in Table 2 and, as a catalyst, boron trifluoride diethyl etherate having a molar ratio of $5 \times 10^{-5}$ based on the trioxane were continuously fed to a charge port of the polymerization machine on the first stage. Further, methylal was continuously fed as a molecular weight adjuster in an amount of 500 ppm based on the trioxane. Table 2 shows a polymerization time period in this case. Further, a solution of 5% by weight of triphenylphosphine having a molar amount twice the amount of the catalyst used in benzene was continuously fed through the charge port of the deactivator mixing machine, to terminate the polymerization, and an oxymethylene crude copolymer was recovered from a discharge port. The continuous polymerization machines were operated for the polymerization while the number of revolution of each shaft was set at approximately 40 rpm, the jacket temperature (polymerization temperature) on the first stage was set at 65° C. and the jacket temperature on the second stage and the jacket temperature of the deactivator mixing machine were set at 40° C., respectively. The thus-obtained crude copolymer was measured for a polymerization yield and a heat weight loss ratio, and Table 2 shows the results.

Further, to 100 parts by weight of the obtained crude copolymer were added 0.3 part by weight of triethylene glycol-bis[3-(3-tert-butyl-5-methyl-4-hydroxyphenyl) propionate] (trade name Irganox 245, supplied by Ciba Geigy, Ltd.), 0.1 part by weight of melamine and 0.05 part by weight of magnesium hydroxide, and these were mixed. The mixture was fed to a vented twin-screw extruder, melt-kneaded at 200° C. under a reduced pressure of 160 Torr and pelletized. The mixture was measured for residence heat stability and mold deposit resistance (MD resistance), and Table 2 shows the results.

Examples 2–4

A crude polymer was produced in the same manner as in Example 1 except that the polymerization time period was changed as shown in Table 2 by changing the combination of the pseudo-triangular plates of the continuous polymerization machines, and the crude polymer was measured for a polymerization yield and a heat weight loss ratio. Table 2 shows the results. Heat-stabilized pellets obtained from the crude copolymer in the same manner as in Example 1 were measured for residence heat stability and mold deposit resistance (MD resistance). Table 2 shows the results.

Example 5

To 100 parts by weight of the crude copolymer obtained in Example 1 was added 0.3 part by weight of triethylene glycol-bis[3-(3-tert-butyl-5-methyl-4-hydroxyphenyl) propionate] (trade name Irganox 245, supplied by Ciba Geigy, Ltd.), and these were mixed. Then, the mixture was pelletized and measured in the same manner as in Example 1. Table 2 shows the results.

Comparative Example 1

A crude polymer was produced in the same manner as in Example 1 except that the polymerization time period was changed as shown in Table 2 by changing the combination of the pseudo-triangular plates of the continuous polymerization machines, and the crude polymer was measured for a polymerization yield and a heat weight loss ratio. Table 2 shows the results. Heat-stabilized pellets obtained from the crude copolymer in the same manner as in Example 1 were measured for residence heat stability and mold deposit resistance (MD resistance). Table 2 shows the results.

Example 6

A crude copolymer was produced in the same manner as in Example 1 except that the amount of 1,3-dioxolane was changed as shown in Table 2, and the crude copolymer was measured for a polymerization yield and a heat weight loss ratio. Table 2 shows the results. Heat-stabilized pellets obtained from the crude copolymer in the same manner as in Example 1 were measured for residence heat stability and mold deposit resistance (MD resistance). Table 2 shows the results.

Examples 7–9

A crude polymer was produced in the same manner as in Example 6 except that the polymerization time period was changed as shown in Table 2 by changing the combination of the pseudo-triangular plates of the continuous polymerization machines, and the crude copolymer was measured for a polymerization yield and a heat weight loss ratio. Table 2 shows the results. Heat-stabilized pellets obtained from the crude copolymer in the same manner as in Example 1 were measured for residence heat stability and mold deposit resistance (MD resistance). Table 2 shows the results.

Example 10

To 100 parts by weight of the crude copolymer obtained in Example 6 was added 0.3 part by weight of triethylene glycol-bis[3-(3-tert-butyl-5-methyl-4-hydroxyphenyl) propionate] (trade name Irganox 245, supplied by Ciba Geigy, Ltd.), and these were mixed.

Then, the mixture was pelletized and measured in the same manner as in Example 6. Table 2 shows the results.

Comparative Example 2

A crude copolymer was produced in the same manner as in Example 6 except that the polymerization time period was changed as shown in Table 2 by changing the combination of the pseudo-triangular plates of the continuous polymerization machines, and the crude copolymer was measured for a polymerization yield and a heat weight loss ratio. Table 2 shows the results. Heat-stabilized pellets obtained from the crude copolymer in the same manner as in Example 1 were measured for residence heat stability and mold deposit resistance (MD resistance). Table 2 shows the results.

Example 11

A crude copolymer was produced in the same manner as in Example 1 except that the feed amount of 1,3-dioxolane was changed as shown in Table 2, and the crude copolymer was measured for a polymerization yield and a heat weight loss ratio. Table 2 shows the results. Heat-stabilized pellets obtained from the crude copolymer in the same manner as in Example 1 were measured for residence heat stability and mold deposit resistance (MD resistance). Table 2 shows the results.

Comparative Example 3

A crude copolymer was produced in the same manner as in Example 1 except that the feed amount of 1,3-dioxolane was changed as shown in Table 2, and the crude copolymer was measured for a polymerization yield and a heat weight loss ratio. Table 2 shows the results. Heat-stabilized pellets obtained from the crude copolymer in the same manner as in Example 1 were measured for residence heat stability and mold deposit resistance (MD resistance). Table 2 shows the results.

Example 12

An oxymethylene copolymer was produced with a continuous polymerization apparatus similar to the apparatus in Example 1. Trioxane in an amount of 80 kg/hour (889 mol/hour), 1,3-dioxolane in an amount shown in Table 3 and, as a catalyst, boron trifluoride diethyl etherate having a molar ratio of $5 \times 10^{-5}$ to the trioxane were continuously fed to a charge port of the polymerization machine on the first stage. Further, methylal was continuously fed as a molecular weight adjuster in an amount of 500 ppm based on the trioxane. The polymerization time period was changed as shown in Table 3 by changing the combination of the pseudo-triangular plates of the continuous polymerization machines. Further, the polymerization was terminated in the same manner as in Example 1. The thus-obtained crude copolymer was measured for a polymerization yield and a heat weight loss ratio. Table 3 shows the results. Further, to 100 parts by weight of the obtained crude copolymer were added 0.3 part by weight of triethylene glycol-bis[3-(3-tert-butyl-5-methyl-4-hydroxyphenyl)propionate] (trade name Irganox 245, supplied by Ciba Geigy, Ltd.), 0.1 part by weight of melamine and 0.05 part by weight of magnesium hydroxide, and these were mixed. Then, the mixture was fed to a vented twin-screw extruder, melt-kneaded at 200° C. under a reduced pressure of 160 Torr and pelletized. The mixture was measured for residence heat stability and mold deposit resistance (MD resistance), and Table 3 shows the results.

Examples 13–15

A crude polymer was produced in the same manner as in Example 12 except that the polymerization time period was changed as shown in Table 3 by changing the combination of the pseudo-triangular plates of the continuous polymerization machines, and the crude copolymer was measured for a polymerization yield and a heat weight loss ratio. Table 3 shows the results. Heat-stabilized pellets obtained from the crude copolymer in the same manner as in Example 12 were measured for residence heat stability and mold deposit resistance (MD resistance). Table 3 shows the results.

Example 16

To 100 parts by weight of the crude copolymer obtained in Example 12 was added 0.3 part by weight of triethylene glycol-bis[3-(3-tert-butyl-5-methyl-4-hydroxyphenyl) propionate] (trade name Irganox 245, supplied by Ciba Geigy, Ltd.), and these were mixed. Then, the mixture was pelletized and measured in the same manner as in Example 12. Table 3 shows the results.

Comparative Example 4

A crude copolymer was produced in the same manner as in Example 12 except that the polymerization time period was changed as shown in Table 3 by changing the combination of the pseudo-triangular plates of the continuous polymerization machines, and the crude copolymer was measured for a polymerization yield and a heat weight loss ratio. Table 3 shows the results. Heat-stabilized pellets obtained from the crude copolymer in the same manner as in Example 12 were measured for residence heat stability and mold deposit resistance (MD resistance). Table 3 shows the results.

Example 17

A crude copolymer was produced in the same manner as in Example 12 except that the feed amount of 1,3-dioxolane was changed as shown in Table 3, and the crude polymer was measured for a polymerization yield and a heat weight loss ratio. Table 3 shows the results. Heat-stabilized pellets obtained from the crude copolymer in the same manner as in Example 12 were measured for residence heat stability and mold deposit resistance (MD resistance). Table 3 shows the results.

Examples 18–20

A crude copolymer was produced in the same manner as in Example 17 except that the polymerization time period was changed as shown in Table 3 by changing the combination of the pseudo-triangular plates of the continuous polymerization machines, and the crude copolymer was measured for a polymerization yield and a heat weight loss ratio. Table 3 shows the results. Heat-stabilized pellets obtained from the crude copolymer in the same manner as in Example 12 were measured for residence heat stability and mold deposit resistance (MD resistance). Table 3 shows the results.

Example 21

To 100 parts by weight of the crude copolymer obtained in Example 17 was added 0.3 part by weight of triethylene glycol-bis[3-(3-tert-butyl-5-methyl-4-hydroxyphenyl) propionate] (trade name Irganox 245, supplied by Ciba Geigy, Ltd.), and these were mixed. Then, the mixture was pelletized and measured in the same manner as in Example 17. Table 3 shows the results.

Comparative Example 5

A crude copolymer was produced in the same manner as in Example 17 except that the polymerization time period was changed as shown in Table 3 by changing the combination of the pseudo-triangular plates of the continuous polymerization machines, and the crude copolymer was measured for a polymerization yield and a heat weight loss ratio. Table 3 shows the results. Heat-stabilized pellets obtained from the crude copolymer in the same manner as in Example 12 were measured for residence heat stability and mold deposit resistance (MD resistance). Table 3 shows the results.

Example 22

A crude copolymer was produced in the same manner as in Example 12 except that the feed amount of 1,3-dioxolane was changed as shown in Table 3, and the crude copolymer was measured for a polymerization yield and a heat weight loss ratio. Table 3 shows the results. Heat-stabilized pellets obtained from the crude copolymer in the same manner as in Example 12 were measured for residence heat stability and mold deposit resistance (MD resistance). Table 3 shows the results.

Comparative Example 6

A crude copolymer was produced in the same manner as in Example 12 except that the feed amount of 1,3-dioxolane was changed as shown in Table 3, and the crude copolymer was measured for a polymerization yield and a heat weight loss ratio. Table 3 shows the results. Heat-stabilized pellets obtained from the crude copolymer in the same manner as in Example 12 were measured for residence heat stability and mold deposit resistance (MD resistance). Table 3 shows the results.

TABLE 2

| | | DOL amount | | | | Properties of crude copolymer | | | | |
|---|---|---|---|---|---|---|---|---|---|---|
| | TOX amount (mol/hr) | (mol/hr) | DOL (mol %) to TOX | Polymerization time period (minute) | Polymerization yield (wt %) | Heat weight loss ratio (wt %) | Residence heat stability (minutes) | MD resistance (shot) | Bending durability test (times) | Crystallization time period (second) |
| Ex. 1 | 889 | 75.6 | 8.5 | 3 | 92 | 2.2 | 60 | 4000 | 101 | 51 |
| Ex. 2 | 889 | 75.6 | 8.5 | 10 | 94 | 1.7 | 70< | 5000 | 104 | 71 |
| Ex. 3 | 889 | 75.6 | 8.5 | 20 | 98 | 1.2 | 70< | 5000 | 104 | 63 |
| Ex. 4 | 889 | 75.6 | 8.5 | 30 | 99 | 1.0 | 70< | 5000 | 107 | 63 |
| Ex. 5 | 889 | 75.6 | 8.5 | 3 | 92 | 2.2 | 40 | 5000 | 103 | 67 |
| Comp. Ex 1 | 889 | 75.6 | 8.5 | 2 | 94 | 5.3 | 20 | 1000 | 102 | 62 |
| Ex. 6 | 889 | 88.9 | 10.0 | 3 | 91 | 2.0 | 60 | 4000 | 121 | 89 |
| Ex. 7 | 889 | 88.9 | 10.0 | 10 | 93 | 1.6 | 70< | 5000 | 123 | 97 |
| Ex. 8 | 889 | 88.9 | 10.0 | 20 | 97 | 1.1 | 70< | 5000 | 123 | 93 |
| Ex. 9 | 889 | 88.9 | 10.0 | 30 | 98 | 0.9 | 70< | 5000 | 116 | 101 |
| Ex. 10 | 889 | 88.9 | 10.0 | 3 | 91 | 2.0 | 40 | 5000 | 118 | 91 |
| Comp. Ex 2 | 889 | 88.9 | 10.0 | 2 | 93 | 5.0 | 20 | 1000 | 111 | 83 |
| Ex. 11 | 889 | 97.8 | 11.0 | 3 | 91 | 1.9 | 60 | 4000 | 127 | 131 |
| Comp. Ex 3 | 889 | 57.8 | 6.5 | 3 | 96 | 5.1 | 20 | 1000 | 9 | 37 |

Ex.: Example

Comp. Ex.: Comparative Example

Notes)

TOX: Trioxane

DOL: 1,3-Dioxolane

TABLE 3

| | TOX amount (mol/hr) | DOL amount | | Polymerization time period (minute) | Polymerization yield (wt %) | Properties of crude copolymer | | | | |
|---|---|---|---|---|---|---|---|---|---|---|
| | | (mol/hr) | DOL (mol %) to TOX | | | Heat weight loss ratio (wt %) | Residence heat stability (minutes) | MD resistance (shot) | Bending durability test (times) | Crystallization time period (second) |
| Ex. 12 | 889 | 115.6 | 13.0 | 5 | 92 | 1.7 | 70< | 5000 | 142 | 413 |
| Ex. 13 | 889 | 115.6 | 13.0 | 10 | 95 | 1.2 | 70< | 6000 | 146 | 391 |
| Ex. 14 | 889 | 115.6 | 13.0 | 20 | 98 | 1.0 | 70< | 6000 | 145 | 411 |
| Ex. 15 | 889 | 115.6 | 13.0 | 30 | 99 | 0.8 | 70< | 6000 | 147 | 386 |
| Ex. 16 | 889 | 115.6 | 13.0 | 5 | 92 | 1.7 | 50 | 6000 | 144 | 427 |
| Comp. Ex 4 | 889 | 115.6 | 13.0 | 4 | 95 | 5.1 | 30 | 2000 | 143 | 362 |
| Ex. 17 | 889 | 151.1 | 17.0 | 5 | 91 | 1.5 | 70< | 5000 | 175 | 1186 |
| Ex. 18 | 889 | 151.1 | 17.0 | 10 | 95 | 1.1 | 70< | 6000 | 179 | 1131 |
| Ex. 19 | 889 | 151.1 | 17.0 | 20 | 97 | 0.9 | 70< | 6000 | 180 | 1205 |
| Ex. 20 | 889 | 151.1 | 17.0 | 30 | 98 | 0.7 | 70< | 6000 | 182 | 1151 |
| Ex. 21 | 889 | 151.1 | 17.0 | 5 | 91 | 1.5 | 50 | 6000 | 179 | 1041 |
| Comp. Ex 5 | 889 | 151.1 | 17.0 | 4 | 94 | 5.0 | 30 | 2000 | 174 | 1108 |
| Ex. 22 | 889 | 106.7 | 12.0 | 5 | 93 | 1.8 | 70< | 5000 | 135 | 237 |
| Comp. Ex 6 | 889 | 186.7 | 21.0 | 5 | 87 | 1.3 | 70< | 5000 | 204 | 2244 |

Ex.: Example
Comp. Ex.: Comparative Example
Notes)
TOX: Trioxane
DOL: 1,3-Dioxolane

What is claimed is:

1. A polyoxymethylene copolymer which is a polyoxymethylene copolymer obtained by copolymerizing trioxane and 8 to 20 mol, per 100 mol of the trioxane, of 1,3-dioxolane and which (i) has a crystallization time period of 10 to 2,000 seconds at 143° C., (ii) withstands 30 to 1,000 cycles of a bending durability test and (iii) has residence heat stability for 40 minutes or more.

2. The polyoxymethylene copolymer of claim 1, which has a value of at least 60 minutes in terms of the residence heat stability.

3. The polyoxymethylene copolymer of claim 1, which exhibits a value of at least 4,000 shots in a mold deposit resistance test.

4. The polyoxymethylene copolymer of claim 1, which is a polyoxymethylene copolymer obtained by copolymerizing trioxane and 8.5 to 18 mol %, per 100 mol of the trioxane, of 1,3-dioxolane.

5. The polyoxymethylene copolymer of claim 1, which has the property of a crystallization time period being 30 to 1,500 seconds.

6. The polyoxymethylene copolymer of claim 1, which has the property of withstanding 50 to 500 cycles of the bending durability test.

7. The polyoxymethylene copolymer of claim 1, which has the property of a heat weight loss ratio being 2.5% by weight or less.

8. The polyoxymethylene copolymer of claim 1, which contains 0.001 to 1% by weight of magnesium hydroxide particles.

9. The polyoxymethylene copolymer of claim 1, which contains 0.001 to 1% by weight of an amino-substituted triazine compound.

10. A molded article formed of the polyoxymethylene copolymer of claim 1.

11. A hinge part formed of the polyoxymethylene copolymer of claim 1.

* * * * *